(12) United States Patent
Scherer et al.

(10) Patent No.: US 8,473,631 B2
(45) Date of Patent: *Jun. 25, 2013

(54) METHOD AND SYSTEM FOR MANAGING HIGH-BANDWIDTH DATA SHARING

(75) Inventors: Perry Scherer, New York, NY (US); Mario Lattanzio, Huntington, NY (US)

(73) Assignee: Paltalk Holdings, Inc., New York, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 12/590,926

(22) Filed: Nov. 16, 2009

(65) Prior Publication Data

US 2010/0146081 A1    Jun. 10, 2010

Related U.S. Application Data

(63) Continuation of application No. 10/205,817, filed on Jul. 26, 2002, now Pat. No. 7,620,699.

(51) Int. Cl.
  *G06F 15/16* (2006.01)
(52) U.S. Cl.
  USPC ........... 709/232; 709/219; 707/628; 707/632; 707/634; 707/689; 725/86; 725/143
(58) Field of Classification Search
  USPC ................. 709/201–204, 217–219, 224–227, 709/230–232, 200; 707/607, 608, 624–639, 707/687–691, 787–788, 826; 725/143–146, 725/91–96; 705/344
  See application file for complete search history.

(56) References Cited

U.S. PATENT DOCUMENTS

| | | | | |
|---|---|---|---|---|
| 5,720,037 | A * | 2/1998 | Biliris et al. | 725/92 |
| 5,737,531 | A * | 4/1998 | Ehley | 709/208 |
| 5,956,716 | A * | 9/1999 | Kenner et al. | 1/1 |
| 6,535,911 | B1 * | 3/2003 | Miller et al. | 709/217 |
| 6,625,655 | B2 * | 9/2003 | Goldhor et al. | 709/231 |
| 6,792,468 | B1 * | 9/2004 | Bloch et al. | 709/231 |
| 7,240,358 | B2 * | 7/2007 | Horn et al. | 725/87 |
| 7,400,678 | B2 * | 7/2008 | Dankworth et al. | 375/240.01 |
| 7,401,351 | B2 * | 7/2008 | Boreczky et al. | 725/88 |
| 7,650,376 | B1 * | 1/2010 | Blumenau | 709/203 |
| 7,659,922 | B2 * | 2/2010 | Black et al. | 348/143 |
| 7,664,854 | B2 * | 2/2010 | Fukasawa et al. | 709/225 |
| 7,716,358 | B2 * | 5/2010 | Price | 709/231 |
| 7,814,520 | B2 * | 10/2010 | Guedalia | 725/90 |
| 8,185,611 | B2 * | 5/2012 | Price | 709/219 |

(Continued)

*Primary Examiner* — Greg C Bengzon (74) *Attorney, Agent, or Firm* — Ward & Zinna, LLC (57) ABSTRACT

A server arrangement for facilitating the exchange of content between a plurality of user system associated with a common group is provided by employing a centralized server for directing publishing and extracting of content and a plurality of associated servers for facilitating the transmission of content between the user systems. A publisher is directed by the central server to a specific data server where content is to be provided. A consumer is directed by the central server to a specific data server from which content is to be extracted. The system is particularly adept for facilitating the exchange of video data between members of a common group coupled to the Internet.

16 Claims, 5 Drawing Sheets

U.S. PATENT DOCUMENTS

| | | | |
|---|---|---|---|
| 2001/0025316 A1* | 9/2001 | Oh ................................ | 709/231 |
| 2002/0013948 A1* | 1/2002 | Aguayo et al. ................... | 725/91 |
| 2002/0040479 A1* | 4/2002 | Ehrman et al. .................... | 725/95 |
| 2002/0078178 A1* | 6/2002 | Senoh ............................. | 709/219 |
| 2002/0087435 A1* | 7/2002 | Neishi et al. ..................... | 705/27 |
| 2002/0091849 A1* | 7/2002 | Heo ............................... | 709/231 |
| 2002/0188692 A1* | 12/2002 | Horiuchi et al. ............... | 709/213 |
| 2003/0028893 A1* | 2/2003 | H. Addington ................ | 725/115 |
| 2006/0271683 A1* | 11/2006 | Ramaley et al. .............. | 709/226 |
| 2008/0155010 A1* | 6/2008 | Liwerant et al. .............. | 709/202 |
| 2011/0182563 A1* | 7/2011 | Watts et al. ................... | 386/248 |

\* cited by examiner

METHOD AND SYSTEM FOR MANAGING HIGH-BANDWIDTH DATA SHARING

CROSS-REFERENCE TO RELATED APPLICATIONS

This Application is a continuation of Non-Provisional application Ser. No. 10/205,817, filed Jul. 26, 2002 now U.S. Pat. No. 7,620,699, the entire contents of which is herein incorporated by reference.

FIELD OF THE INVENTION

The present invention relates to network communication, specifically the invention relates to high bandwidth communication.

BACKGROUND OF THE INVENTION

Users exchange video and other high bandwidth data over computer networks in various conferencing and sharing arrangements. For example, the Internet is used to facilitate the exchange of video data in video chat areas. Traditionally, high bandwidth data is provided to a predetermined server by the publisher. A consumer is directed to the predetermined system by either a searching application, which searches for location of published material, or by static locating information such as web page hyperlink information. Publishers provide data to the predetermined server while consumers continue to retrieve data from the predetermined server. When the number of publishers increases, the server performance in providing data to consumers deteriorates and eventually may become unsatisfactory for certain applications. Accordingly, there is a need for a flexible and scalable arrangement for exchanging high bandwidth data.

The video data is usually transmitted to a specific location and read from the same location or another predetermined location. When there are many parties providing and receiving video data from the same location, servers often overload, which results in slow or faulty operation. The problem is especially acute at video-chat areas where an unknown number of participants may potentially exchange video data by employing a predetermined server or servers. Thus, there is a need to ensure that servers do not overload when unexpected level of data are received and transmitted by a plurality of users associated with a high bandwidth data exchange group.

SUMMARY OF THE INVENTION

Therefore, in accordance with the invention, a method is presented for facilitating the 5 exchange of high bandwidth data, such as video data, between an unknown number of content publishing systems (herein "publishers") and content consuming systems (herein "consumers"). A presence server is provided to manage publishing and consuming by participating systems. The actual exchange of data in publishing and consuming is facilitated by a plurality of data servers under the direction of the presence server. Each of the data servers is adapted to facilitate the exchange of data between publishers and consumers. The presence server directs publisher systems to provide content to one of the plurality of data servers and directs consumer systems to extract content from data server. Accordingly, the system can efficiently provide data from an unknown number of publishers to an unknown number of consumers by employing a scalable server configuration where the centralized publishing server directs the publishers and consumers to the individual servers rather than handling the actual exchange of data between the corresponding systems. The provision of data from publisher systems to consumer systems is performed by each server to which a publisher system or a consumer system is directed by the presence server. Accordingly, data servers can be added to a group of participants, which are exchanging data, in a seamless manner.

In one embodiment, the invention provides a method for facilitating the exchange of high bandwidth data between publishing systems and consuming systems. The method provides a centralized presence server coupled to a network. The presence server receives requests to publish content from publishing systems and directs the publishing systems to one of a plurality of servers. The presence server further receiving requests to retrieve content from at least one consuming system. The method provides a plurality of data servers, which store content from the publishing systems and provide the content to consuming systems in response to content requests from consuming systems.

DETAILED DESCRIPTION OF THE INVENTION

The present discussion illustrates the details of an arrangement for receiving high bandwidth data from an unknown number of publishers and providing the high bandwidth data to an unknown number of consumers. As is known in the art, a publisher is generally the system making available some type of high bandwidth data, such as video data. In one embodiment, the provided data includes video, audio, text and game data still images. A consumer is generally the system retrieving the high bandwidth data made available by the publisher. Often times a single system is both a publisher and a consumer, as is the common scenario in a video chat area. However, for various reasons, there are times when a system serves only as a publisher or as a consumer.

The structure and operation of a system in accordance with the invention will now be discussed by reference to an exemplary interactive video conferencing system. The video conferencing system is adapted to allow for an unknown number of participants of a particular forum to publish or retrieve near-real-time content associated with other participants. One example of such videoconference system is an Internet video chat system, which allows various user interest groups to exchange near-real-time content. The system of the invention preferably provides for a plurality of videoconference forums.

Furthermore, in the required system, the number of publishers and amount of data provided by each publisher are generally unpredictable. The number of consumers and available bandwidth for each consumer are also generally unpredictable. Thus, any predetermined amount of computing power allotted for providing data from publishers to consumers may become insufficient by an increase in either the number of publishing systems or the number of consumer systems, or became wasted by a corresponding decrease. Accordingly, it is impossible to predetermine the number of servers required to adequately allow for consumers to retrieve data from a publishers.

Figure 1:
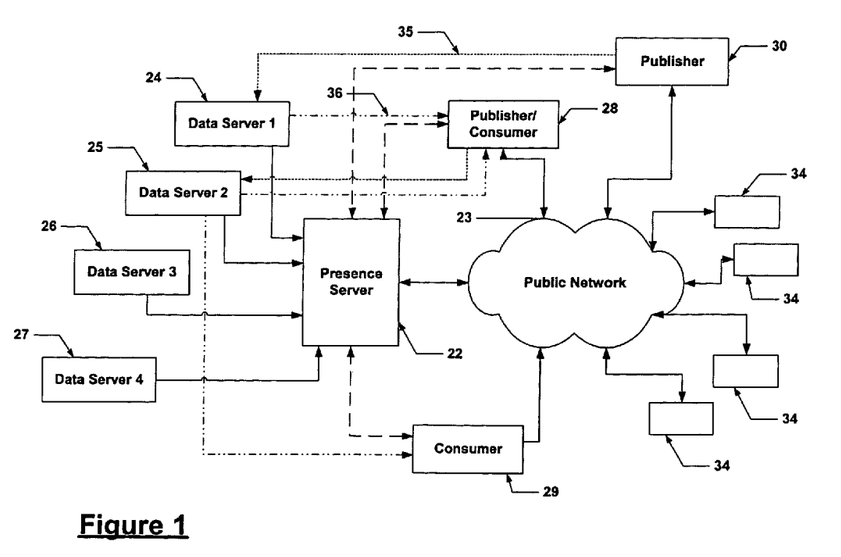
FIG. 1 illustrates a network arrangement in accordance with the invention.

FIG. 1 illustrates a network arrangement for facilitating the exchange of data in accordance with the invention. The illustrated network arrangement includes a plurality of data servers 24, 25, 26, 27, a presence server, 22, and a plurality of consumers 28, 29, and publishers 28, 30. The illustrated network arrangement further includes a public network 33 such as a wide area network. In one embodiment, the public network 33 is the Internet. The data servers 24, 25, 26, 27, presence server 22, publishers 28, 30, and consumers 28, 29 are preferably coupled to the public network to facilitate transmission of data between such respective entities. The presence server 22 is preferably coupled to each of the data servers 24, 25, 26, 27, by a dedicated connection to exchange control and status data.

The various servers are preferably computer systems configured to execute an operating system such as the UNIX operating system. As may be appreciated, each server executes various applications and protocols as required for facilitating corresponding functionality. One skilled in the art will appreciate that the functions provided by the data servers and presence server may be facilitated by more than one server cooperating to facilitate such functions.

Generally, the presence server 22 operate to direct publishers 28, 30 and consumers 28, 29 to an appropriate data server. In one embodiment, the presence server 22 further includes a user server (not shown) providing a front end interface for facilitating a user conference Internet site. The user server preferably includes an information area indicating publishers providing content to the specific group or forum.

Generally, a first publisher 30 transmits a request to publish data to the presence server 22. The presence server 22 identifies a first data server 24 to which publishing should be directed. The presence server 22 submits a response to the requesting first publisher 30, indicating the first data server 24 to which publishing should be directed. The first publisher 30 establishes a communication link 35 with the first data server 24 and provides the high bandwidth data to the server. As may be appreciated the communication link 35 is facilitated by way of the public network 23 and that directly connecting the publishing to the data server.

Similarly, a first consumer transmits request to the presence server 22 for retrieving high bandwidth data of the first publisher. The presence server 22 identifies the first data server 24 to which the first publisher 30 is providing data. The presence server 22 submits a response to the first consumer 28, indicating the first data server 24 where data from the identified publisher 30 is available. The consumer 28 establishes a communication link 36 with the first data server 24 and retrieves the publisher data from the first data server. As additional publishers request to publish content, the presence server 22 directs the publishing between the available data servers 24, 25, 26, 27 to ensure that the available processing power and bandwidth at each data server is sufficient to allow for minimum quality service to potential consumers. In one embodiment, the presence server 22 employs a load-balancing algorithm to ensure that all data servers equally share the processing burden in facilitating data exchange between publishers and consumers.

Figure 2:
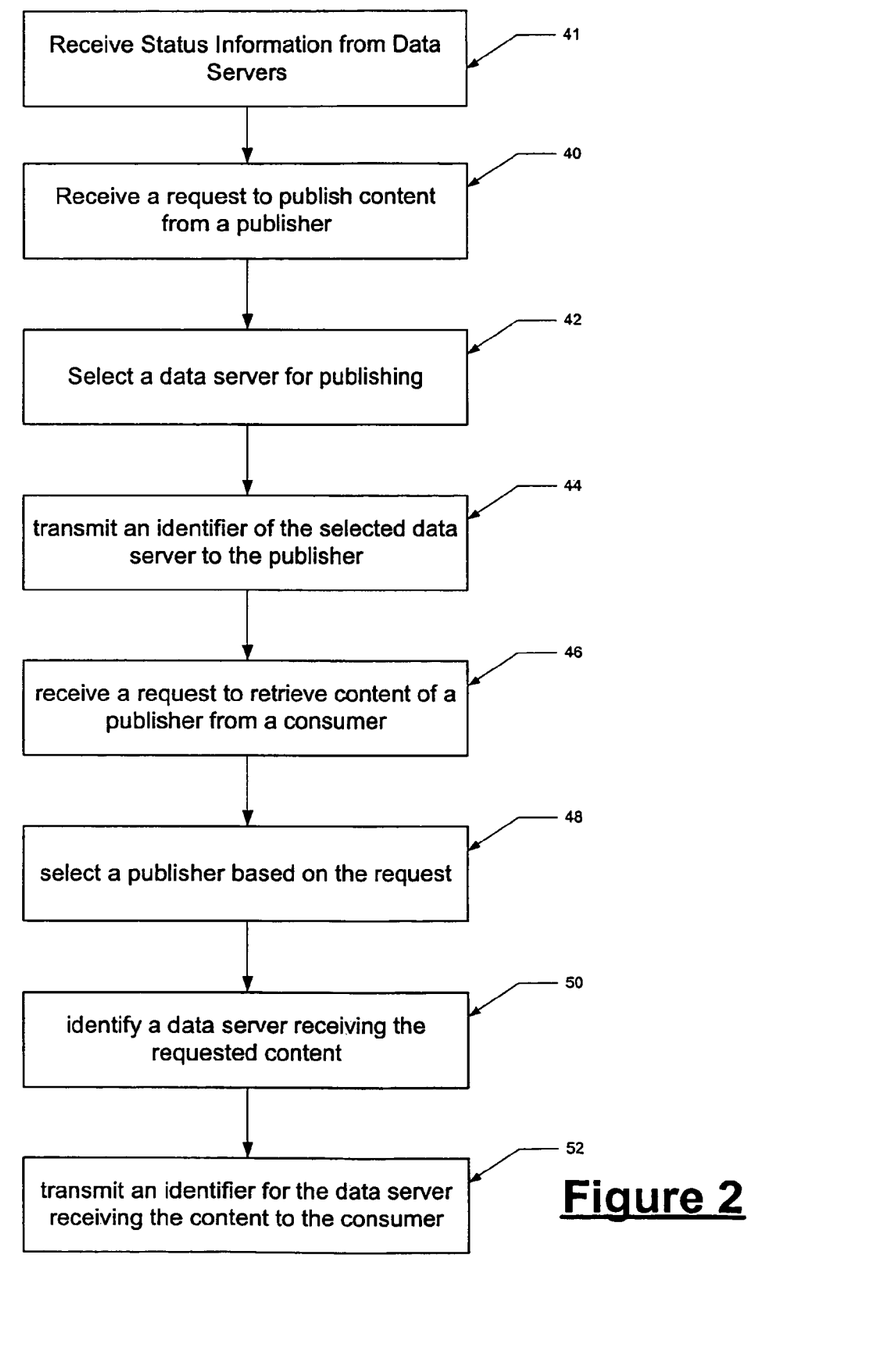
FIG. 2 is a flow diagram illustrating the basic operation of the presence server of FIG. 1.

FIG. 2 illustrates the operational flow of the presence server 22 from the network arrangement of FIG. 1. Publishers and consumers establish communication links with the presence server 22. The communication link between publishers, consumers, and the presence server 22 is preferably a persistent full duplex TCP connection. The presence server 22 regularly receives status data from data servers (step 41). In one embodiment, the presence server 22 is further coupled to an instant messaging (herein "IM") service and to a voice communication service (not shown). Each of the publishers and consumers preferably execute an application, which facilitates conferencing including generating and displaying video data. One example of such application is an Internet browser executing a JAVA application, which includes text and video screen portions. The presence server 22 receives requests from publishers to publish content (step 40). In one embodiment, the requests are by an IM protocol. In one embodiment, the request to publish content is received by the user server. In this embodiment, the user server stores an indication that a publishing request was received from the publisher. The user server may also broadcast to the group members that a user is publishing content that is available for viewing. At this time, other users may request to view the content published by the requesting publisher. However, content from the requesting publisher is not yet available for consuming. The presence server 22 identifies the data server to which publishing should be directed in accordance with information relating to data server operation, which is regularly received from the data servers (step 42). Further details relating to the operation of the presence server 22 in identifying the data server to which a publisher is directed are provided below with reference to FIG. 4.

The presence server 22 preferably assigns the identified data server to the requesting publisher. In one embodiment, a specific server IP address as well as a specific port are assigned to the publisher. The presence server 22 transmits the data server identification data to the requesting publisher along with corresponding indication to start pushing data to the data server (step 44). The presence server 22 also transmits the IP address and port information to consumers requesting to view the published content. At this time, consumers can initiate pulling data submitted by publishers. The publisher transmits content to the identified data server in accordance with the received data server identification data. In one embodiment, the content is transmitted by a PUSH method whereby a new connection to the data server is established for every content update, during which corresponding content is transmitted from the publisher to the data server. Preferably, as discussed above, the publisher executes software and hardware, which operate to capture and format the high bandwidth data for transmission. When sufficient data is available for updating the content provided to the data server, the publisher establishes a connection with the data server and provides the new data. Accordingly, the data server has available a current snapshot of content from various publishers.

In one embodiment, the presence server 22 tracks the number of consumers receiving content from a publisher. When a consumer stops viewing content from a publisher, a corresponding indication is provided to the presence server 22. When there are no consumers viewing a publisher's content, the presence server 22 instructs the publisher system to stop pushing content to the data server and wait until another consuming request is received so as to conserve bandwidth.

The presence server 22 receives requests for content from consumers (step 46). In one embodiment a consumer request identifies a specific publisher. In another embodiment, a consumer request identifies a group of publishers. In yet another embodiment, a consumer request is in the form of a search query, searching for publishers in accordance with specified characteristics. The presence server 22 selected a publisher based on the request (step 48). The presence server 22 identifies a data server receiving content from the publisher (step 50). The presence server 22 responds to consumer requests by providing data for facilitating the retrieval of the requested content (step 52). In one embodiment, the provided data includes an IP address and a port number of a data server to which the consumer is directed. In one embodiment, a new communication link is established by the consumer with the designated port for every retrieval of updated content instead of maintaining a constant connection.

The processes associated with each data server are preferably independent from processes executing on other data servers or on the presence server. Each data server periodically provides status information to the presence server. The status information preferably includes an indication of CPU load for the data server. In one embodiment, the status data is provided as an Instant Message UDP packet. The data server receives requests to publish content from a publisher. The data server receives data from the presence server 22 to indicate that an incoming PUSH session request from a publisher is arriving. The data server responds by establishing a communication session with the requested port. The data server preferably receives data from the publisher and stores the data in an allocated location associated with the publisher. The data server receives requests for content from consumers. The data server responds to consumer requests by establishing a connection with the consumer and providing content data to the consumer, as discussed above.

Preferably, when an increase in capacity is required, additional data servers are initiated. An initiated data server transmits a special message to the presence server 22 to indicate its availability and status. The presence server 22 adds the new data server to its list of available servers (discussed below). The new server becomes part of the plurality of server available to the presence server. Accordingly, the system of the present invention is easily scalable and adaptable for servicing unknown number of publishers and consumers.

Figure 3:
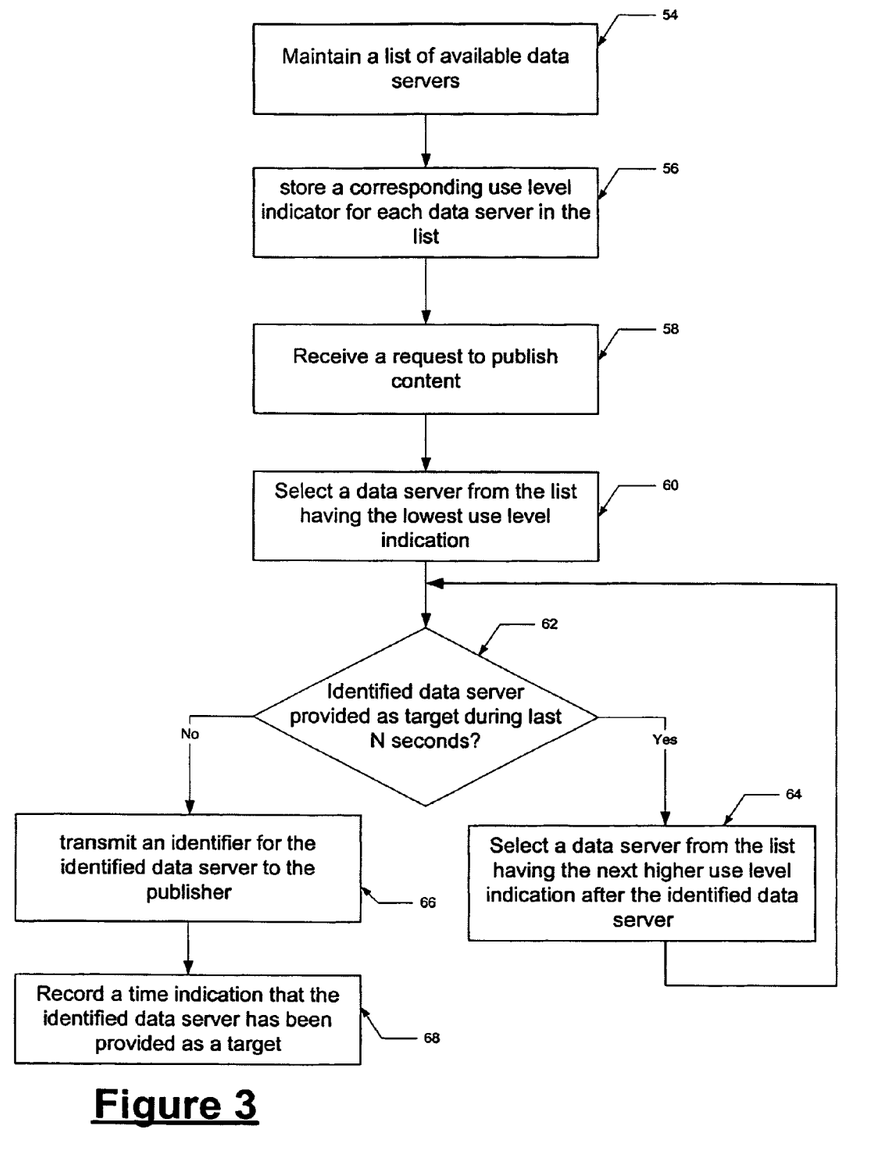
FIG. 3 is a flow diagram illustrating the operation of the presence server in identifying a target server for directing content publishing by a requesting publisher.

FIG. 3 is a flow diagram illustrating a process for the presence server 22 to identify a data server in response to a publication request. The presence server 22 preferably stores a list of available data servers and associated CPU loads (step 54). The status of the servers in the list is periodically updated by receiving status data from each server, as discussed above (step 56). In one embodiment, the status data is a UDP packet, which identifies the data server and indicates server usage rate such as by providing the number of publisher and consumer transactions processed by the data server over a predetermined recent period. The server list is advantageously sorted in accordance with the server usage indication such that the least busy server is at an end of the list. When a request for publishing is received by the presence server 22 (step 58), data associated with the least busy server from the list is retrieved (step 60). In one embodiment, the retrieved data indicates a time when the server was last provided as a publishing target. The presence server 22 determines if the identified server was provided as a target during a predetermined recent period (step 62). If the least busy server was not provided as a publishing target within a predetermined recent period, the presence server 22 provides the server IP address and a port designation to the requesting publisher (step 66). The presence server 22 also records a time indication that the identified data server has been provided as a target (step 68). If the least busy server was provided as a target within the predetermined recent period, the presence server 22 retrieves data for the next least busy server from the list (step 64). The presence server 22 performs the same evaluation for the next server, determining whether it was provided as a publishing target within the predetermined recent period. The process continues until a qualified server is identified.

By restricting the provided target server to a server that was not provided as a target within a predetermined recent period, the method of the invention avoids a black hole effect where all producers are routed to a faulty data server, such as a data server, which is not executing any transactions and is therefore theoretically least busy. The method of FIG. 3 further provides for load balancing between data servers, this contributes to system performance uniformity in facilitating the exchange of data between consumers and publishers.

Figure 4:
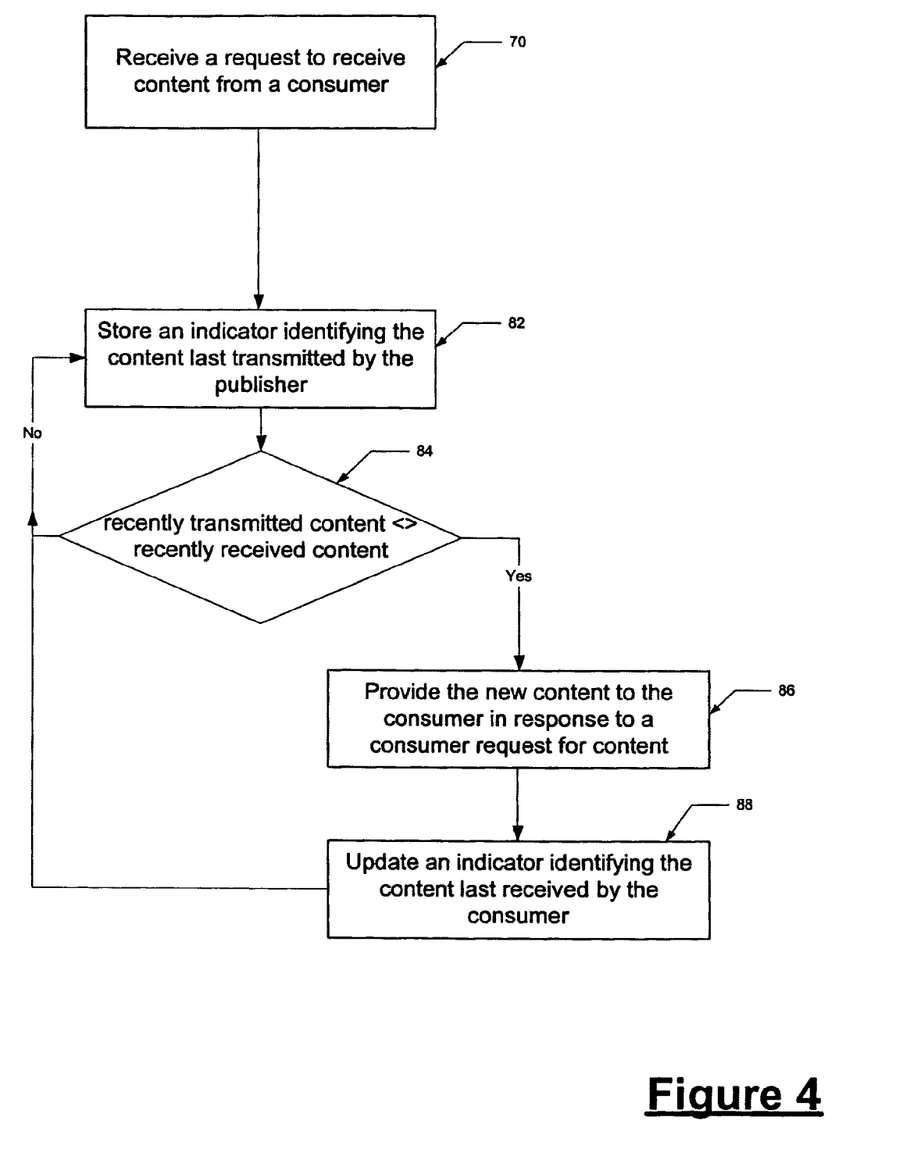
FIG. 4 is a flow diagram illustrating the operation of a data server in transmitting high bandwidth data between publisher and consumer systems associated with disparate connection rates.

FIG. 4 illustrates rate balancing method employed by a data server of the invention to facilitate the exchange of near-real time content between providers and consumers associated with disparate communication rates. Consumers are automatically provided content in accordance with their relative consumption rates as compared to the associated publishing rate by tracking the last received frame from a publisher. For consumers having a communication rate higher than the corresponding publishing rate, the data server does not provide data in the consumer PULL session unless frame data, which is more recent than the last received frame, is available from the publisher. Hence, only when the recently transmitted data from the publisher is different from the recently received data, the data server provides an indication to the consumer to initiate a PULL session.

When the consumer is associated with a communication rate lower than the corresponding publishing rate, the frames retrieved by the consumer are the most recent available when the consuming PULL request is made. Hence, with a fast publisher and slow consumer, the data server provides the consumer with every Nth video frame of the publisher data as determined by the difference in publishing and consuming rates. By the data server providing the most recent frame and allowing for skipping of frames, the consumer receives video images that are relatively current instead of receiving video images that have been provided some time ago. The transmission method of FIG. 4 allows for smoother interaction between the consumer and publisher in a scenario such as a live chat area or action gaming zone. In one embodiment, a limit is set on the maximum publication rate by any publisher so as to prevent high disparity between consumers and publishers as well as to conserve CPU power and communication bandwidth.

Figure 5:
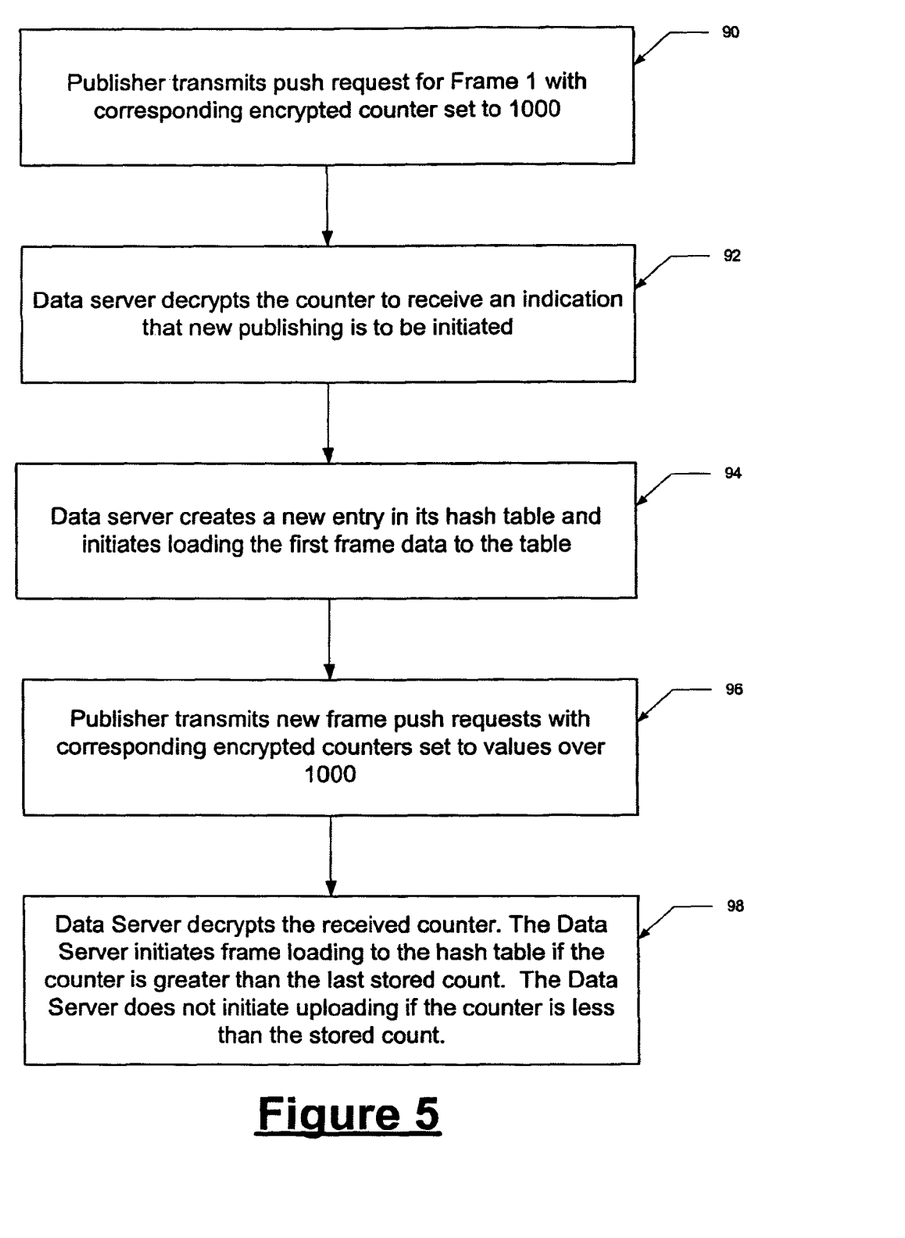
FIG. 5 illustrates a method for preventing unauthorized transmission and extraction of content to and from a data server.

The data server receives a request to receive content from a consumer (Step 70). The data server stores an indication of the content last transmitted by the publisher (Step 82). The data server determined whether the last transmitted content for the consumer is different from the last transmitted publisher content (Step 84). For the first frame provided to the consumer, the content is different. Hence, the data server provides the content to the consumer by instructing the consumer to initiate a PULL session for the content (Step 86). The data server updates an indicator for the consumer to identify the most recently received content (Step 88). The data 15 server than return to Step 82 to store an updated indicator when content is received from the publisher. FIG. 5 illustrates a method for tracking the content most recently received from a publisher.

The publisher initiates a PUSH session to transmit the first frame of content to the data server (Step 90). The publisher also includes an encrypted counter along with the PUSH request. The counter is set to a predetermined value such as 1000 for the first frame PUSH request. The data server receives the PUSH request and decrypts the counter (Step 92). The data server interprets the counter value to indicate that this is the first frame of data. A new entry is created in a hash table of the data server, associated with the publisher, to indicate the counter value and corresponding frame data (Step 94). The publisher transmits a request to PUSH the second frame with the encrypted counter set to 1001, for example (Step 96). The data server decrypts the counter and compares the counter value to counter stored in the hash table entry for the publisher. If the counter value is greater than the table value, the data server allows the publisher to initiate the PUSH session and provide additional frame data. If the counter value is equal to or less than the value in the hash table, the data server discards the PUSH request (Step 98). As may be appreciated, the method illustrated in FIG. 5 is equally applicable to storing an identifier for the content most recently received by a consumer, as part of the balancing method illustrated in FIG. 4. Moreover, the method illustrated in FIG. 5 is useful for preventing unauthorized publishing of content and unauthorized reception of content by employing the counter pairs as well as the associated encryption key pairs. An unauthorized publisher or consumer will not have the proper encryption data to provide the encrypted counter to the data server. Accordingly, the method of FIG. 5 facilitates secure communication of content between publishers and consumers.

The structure and operation of a system of the present invention was discussed with reference to the illustrated video conference system. However, as may be appreciated, the present invention is not limited to systems which deliver video content between participants in a conference but is applicable to the delivering other high bandwidth data between an unknown number of participants in multiple groups. For example, the invention is applicable to a plurality of participants in a multiple player video game, which requires sharing data between participating game systems.

Although the present invention was discussed in terms of certain preferred embodiments, the invention is not limited to such embodiments. A person of ordinary skill in the art will appreciate that numerous variations and combinations of the features set forth above can be utilized without departing from the present invention as set forth in the claims. Thus, the scope of the invention should not be limited by the preceding description but should be ascertained by reference to claims that follow.

What is claimed is:

1. A method for providing near real-time video data to a consumer system, the data provided by a data server receiving the data from a publisher system, the method comprising:
    (a) receiving video data from the publisher system at a first transmission rate, the video data associated with a plurality of video frames;
    (b) updating a first indicator identifying the most recent video frame received at the data server from the publisher system;
    (c) receiving a request for the video data from a consumer system associated with a second transmission rate, the second transmission rate higher than the first transmission rate;
    (d) providing or transmitting information to the consumer system for enabling the consumer system to establish a direct connection via a computer network;
    (e) providing or transmitting the video data to the consumer system in response to receiving the request for the video data;
    (f) updating a second indicator identifying the most recent video frame provided to the consumer system;
    (g) determining whether available video data at the data server includes a video frame that had not yet been provided or transmitted to the consumer system by comparing the first and second indicators; and
    (h) providing to the consumer system the video frame that had not yet been provided or transmitted to the consumer system in response to determining that the video frame had not yet been provided or transmitted to the consumer system and returning to step (f).

2. The method of claim 1, wherein the content is provided or transmitted to the consumer system in or via a PULL session.

3. The method of claim 1, further comprising:
    facilitating a conference which includes a plurality of user systems, wherein each user system is both a system which publishes content and a system which consumes content.

4. The method of claim 1, wherein a system which publishes a first data content also consumes a second data content.

5. The method of claim 1, further comprising:
    if updated content is available via the publisher system, establishing a new connection between the publisher system and the data server for transmitting the updated content from the publisher system to the data server.

6. The method of claim 1, further comprising instructing the publisher system to stop transmitting the video data to the consumer system when the consumer system stops viewing the video data provided by or from the publisher system.

7. The method of claim 6, further comprising instructing the publisher system to wait until a second one or more requests to receive or retrieve video data is received.

8. The method of claim 7, further comprising:
    instructing the publisher system to stop transmitting the video data to the data server when the consumer system stops viewing the video data provided by or from the publisher system; and
    instructing the publisher system to wait until a next one or more requests to retrieve or receive video data is received.

9. The method of claim 8, wherein the publisher system stops transmitting the video data to the data server when the consumer system stops viewing the video data provided by or from the publisher system, and further wherein the data server instructs the publisher system to wait until a second one or more requests to receive or retrieve video data is received.

10. A method for providing near real-time video data to a consumer system from a data server that receives the video data from a publisher system, the method comprising:
    (a) receiving at the data server video data from the publisher system;
    (b) updating a first indicator identifying a most recently received video frame received at the data server from the publisher system;
    (c) receiving a request for the video data from a consumer system;
    (d) providing the video data to the consumer system in response to receiving the request for the video data;
    (e) updating a second indicator identifying the most recent video frame provided to the consumer system;
    (f) comparing the first indicator and the second indicator to determine whether available video data includes a video frame that had not been provided to the consumer system;
    (g) providing to the consumer system the video frame that had not been provided to the consumer system in response to determining that said video frame had not been provided to the consumer system and returning to step (e).

11. The method of claim 10 further comprising:
(h) waiting for receipt of additional video data in response to determining in step (f) that no additional video frames are available at the data server.

12. The method of claim 10 wherein video data is received from the publisher system at a first transmission rate and video data is provided to the consumer system at a second transmission rate that is different from the first transmission rate.

13. The method of claim 12 wherein the first transmission rate is higher than the second transmission rate.

14. The method of claim 12 wherein the second transmission rate is higher than the first transmission rate.

15. The method of claim 14 further comprising:
(h) waiting for receipt of additional video data in response to determining in step (f) that no additional video frames are available at the data server.

16. The method of claim 1 further comprising waiting for receipt of additional video data in response to determining in step (g) that all available video data at the data server had been provided or transmitted to the consumer system.

* * * * *